US012754837B2

(12) United States Patent
Bae et al.

(10) Patent No.: US 12,754,837 B2
(45) Date of Patent: Oct. 6, 2026

(54) DATA STORAGE DEVICE PERFORMING CHECKPOINTING OPERATION AND METHOD OF OPERATING THE SAME

(71) Applicants: SK hynix Inc., Gyeonggi-do (KR); Korea Advanced Institute of Science and Technology, Daejeon (KR)

(72) Inventors: Hanyeoreum Bae, Daejeon (KR); Donghyun Gouk, Daejeon (KR); Seungjun Lee, Daejeon (KR); Jiseon Kim, Daejeon (KR); Sungjoon Koh, Daejeon (KR); Jie Zhang, Beijing (CN); Myoungsoo Jung, Daejeon (KR)

(73) Assignees: SK hynix Inc., Gyeonggi-do (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 19/042,584

(22) Filed: Jan. 31, 2025

(65) Prior Publication Data

US 2025/0252049 A1 Aug. 7, 2025

(30) Foreign Application Priority Data

Feb. 5, 2024 (KR) ........................ 10-2024-0017149
Aug. 21, 2024 (KR) ........................ 10-2024-0112279

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
CPC ......... G06F 12/0246; G06F 2212/7201; G06F 3/061; G06F 11/1474; G06F 3/0619; G06F 2212/1024; G06F 2212/1032; G06F 2212/7204; G06F 3/0659; G06F 3/0679; G06F 11/1471; G06F 2212/7208
See application file for complete search history.

(56) References Cited

U.S. PATENT DOCUMENTS

2016/0098351 A1* 4/2016 Bahn ................... G06F 12/0246 711/144
2020/0110537 A1* 4/2020 Hahn ...................... G06F 3/061
(Continued)

FOREIGN PATENT DOCUMENTS

KR 10-2016-0027805 A 3/2016
KR 10-2020-0035592 A 4/2020
KR 10-2022-0037184 A 3/2022

OTHER PUBLICATIONS

NVM Express, INC., "NVM Express Base Specification." [Online]. Available: https://nvmexpress.org/wp-content/uploads/NVM-Express-Base-Specification-2.0c-2022.10.04-Ratified.pdf.
(Continued)

*Primary Examiner* — Tasnima Matin
(74) *Attorney, Agent, or Firm* — IP&T GROUP LLP

(57) ABSTRACT

A data storage device includes a memory array including a data region and a journal region; and a control circuit configured to generate journal region information including an address of the journal region, process a transaction command corresponding to a transaction based on the journal region information, and perform a checkpointing operation on a selected transaction among a predetermined number of transactions.

13 Claims, 7 Drawing Sheets

S100

(56) References Cited

U.S. PATENT DOCUMENTS

| | | | | |
|---|---|---|---|---|
| 2020/0218619 | A1* | 7/2020 | Hwang | G06F 12/0868 |
| 2022/0083515 | A1* | 3/2022 | Yoon | G06F 16/156 |
| 2022/0206715 | A1* | 6/2022 | Kim | G06F 3/0656 |
| 2022/0253244 | A1* | 8/2022 | Lee | G06F 3/0656 |

OTHER PUBLICATIONS

Intel Corporation, "Intel® Optane™ DC SSD Series." [Online]. Available: https://www.intel.com/content/www/us/en/products/details/memory-storage/data-center-ssds/optane-dc-ssd-series.html.
Xiao-Yu Hu et al., "Write Amplification Analysis in Flash-Based Solid State Drives," in SYSTOR '09: Proceedings of SYSTOR 2009: The Israeli Experimental Systems Conference, 2009, Article. No. 10.
Vijay Chidambaram et al., "Optimistic Crash Consistency," in SOSP '13: Proceedings of the Twenty-Fourth ACM Symposium on Operating Systems Principles, 2013, pp. 228-243.
Kyuhwa Han et al., "WAL-SSD: Address Remapping-Based Write-Ahead-Logging Solid-State Disks," IEEE Transactions on Computers, Feb. 2020, pp. 260-273, vol. 69, No. 2.
Intel Corporation, "Intel® Solid State Drive 750 Series." [Online]. Available: https://www.intel.com/content/dam/www/public/us/en/documents/product-specifications/ssd-750-spec.pdf.
Donghyun Gouk et al., "Amber*: Enabling Precise Full-System Simulation with Detailed Modeling of All SSD Resources," in Proceedings of 2018 51st Annual IEEE/ACM International Symposium on Microarchitecture (MICRO), 2018, pp. 469-481.
Nathan Binkert et al., "The gem5 Simulator," ACM SIGARCH Computer Architecture News, May 2011, pp. 1-7, vol. 39.
Miryeong Kwon et al., "Trace Tracker: Hardware/Software Co-Evaluation for Large-Scale I/O Workload Reconstruction," in Proceedings of 2017 IEEE International Symposium on Workload Characterization (IISWC), 2017.
Matias Bjørling et al., "Open-Channel Solid State Drives," Vault, Mar. 2015. [Online]. Available: https://events.static.linuxfound.org/sites/events/files/slides/LightNVM-Vault2015.pdf.
Jingpei Yang et al., "Don't stack your Log on my Log," in Proceedings of 2nd Workshop Interact. NVM/Flash Operating Syst. Workloads, 2014, pp. 1-10.

* cited by examiner

<Prior Art>

<Prior Art>

DATA STORAGE DEVICE PERFORMING CHECKPOINTING OPERATION AND METHOD OF OPERATING THE SAME

CROSS-REFERENCE TO RELATED APPLICATION

The present application claims priority under 35 U.S.C. § 119(a) to Korean Patent Applications No. 10-2024-0017149, filed on Feb. 5, 2024, and No. 10-2024-0112279, filed on Aug. 21, 2024, which are incorporated herein by reference in their entirety.

BACKGROUND

1. Technical Field

Embodiments of the present disclosure generally relate to a data storage device, and more specifically, to a data storage device that performs a checkpointing operation.

2. Related Art

FIG. 1 is a block diagram illustrating a conventional checkpointing operation.

Referring to FIG. 1, a host 1 using a journaling file system temporarily stores data in a journal region 3 of a data storage device 2 during a write operation.

When data is completely stored in the journal region 3, the host 1 stores the data again in a data region 4 of the data storage device 2.

FIG. 2 illustrates a data structure of the journal region 3.

Referring to FIGS. 1 and 2, a single transaction data includes multiple data blocks, and in order to distinguish data by transaction, a descriptor block is added in front of the data blocks, and a commit block is added next to the data blocks.

Each of the descriptor block, data blocks, and commit block includes a block header which includes metadata indicating a type of a block and a transaction identifier.

The descriptor block includes a logical address list including a plurality of logical addresses (LBAs). Each entry in the logical address list indicates a logical address of the data region 4 where a corresponding data block is to be stored. When the descriptor block and data blocks are completely written to the journal region 3, the host 1 writes information indicating that the transaction is valid at the commit block.

The host 1 considers a series of write operations on the descriptor block to the commit block as one transaction.

Each transaction is assigned a unique transaction identifier (trans-id) that increases in an order of time. Each of the descriptor block, data blocks, and commit block stores a corresponding transaction identifier.

The data structure of the journal region 3 further includes a super block, which stores a transaction identifier indicating the last transaction in which a checkpointing operation has been performed.

In addition to the transaction identifier, the super block stores metadata related to a location of the journal region, such as a start address of the journal region 3 and a length of the journal region 3.

The host 1 stores a transaction list 5 and uses the stored transaction list 5 to manage committed transactions, i.e., transactions recorded in the journal region 3.

Each entry of the transaction list 5 includes a journal head (JH) 6. The journal head 6 includes a buffer head (BH) 7. The buffer head 7 stores a transaction identifier and indicates data information 8 including data blocks (DATAs) recorded in the journal region 3 corresponding to the transaction and logical addresses (LBAs) to store the data blocks.

In the conventional technology, the checkpointing operation is initiated by the host 1.

When the checkpointing operation is initiated, the host 1 visits all buffer heads 7 included in the transaction list 5 and writes data to the data region 4 of the data storage device 2 through a nonvolatile memory express (NVMe) driver 9.

After writing the data, the host 1 writes, in the super block of the journal region 3, the transaction identifier of the transaction on which the checkpointing operation has been performed. Accordingly, when the checkpointing operation is completed, the super block stores the transaction identifier corresponding to the transaction on which the checkpointing operation has been lastly performed.

The conventional host 1 also performs a recovery operation.

During the recovery operation, the host 1 scans all transactions in the journal region 3. If there is a transaction corresponding to a transaction identifier greater than a transaction identifier recorded in the super block, the transaction is considered to have failed the checkpointing operation.

The host 1 checks whether the commit block of such transaction contains valid information to verify data integrity.

If the commit block is valid, the host 1 records the journaled data in the data region 4 by referring to the logical address list stored in the descriptor block of the transaction.

Through such process, the host 1 can recover from a crash caused by a service interruption or failure.

In this way, in the conventional technology, since the data storage device 2 performs an operation of writing to the journal region 3 as well as an operation of writing to the data region 4, the write operations increase, causing reduction in a lifespan of the data storage device 2.

In addition, since the checkpointing operation is performed by the intervention of the host 1, the overall performance of the system is limited during the checkpointing operation, which can cause a bottleneck in tasks requiring high performance.

SUMMARY

In accordance with an embodiment of the present disclosure, a data storage device may include a memory array including a data region and a journal region, and a control circuit. The control circuit may generate journal region information including an address of the journal region, process a transaction command corresponding to a transaction based on the journal region information, and perform a checkpointing operation on a selected transaction among a predetermined number of transactions.

In accordance with an embodiment of the present disclosure, a method of operating a data storage device may include assigning a data region and a journal region in a memory array, generating journal region information including an address of the journal region, processing a transaction command corresponding to a transaction based on the journal region information, and performing a checkpointing operation on a selected transaction among a predetermined number of transactions.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and describe various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of teachings of the present disclosure. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 3:
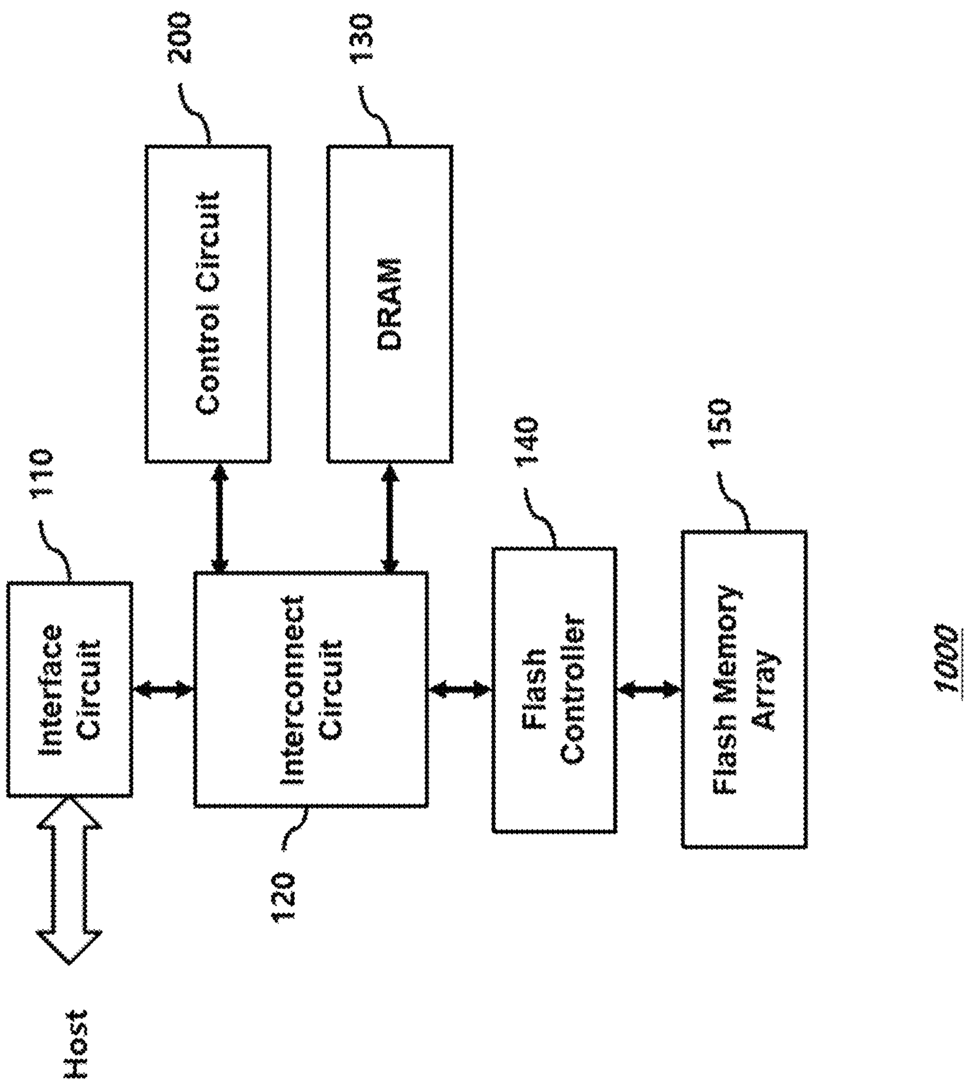
FIG. 3 illustrates a data storage device according to an embodiment of the present disclosure.

FIG. 3 is a block diagram showing a data storage device 1000 according to an embodiment of the present disclosure.

Referring to FIG. 3, the data storage device 1000 includes an interface circuit 110, an interconnect circuit 120, a dynamic random access memory (DRAM) 130, a flash controller 140, a flash memory array 150, and a control circuit 200.

A journal region and a data region, as logical spaces, may be defined in the flash memory array 150.

The interface circuit 110 communicates with a host. The DRAM 130 stores data temporarily. A memory controller for controlling the DRAM 130 may be further included. The interconnect circuit (e.g., a bus) 120 connects the control circuit 200, the interface circuit 110, the DRAM 130, and the memory controller.

The basic configuration and operation of the interface circuit 110, the interconnect circuit 120, the DRAM 130, the flash controller 140, and the flash memory array 150 are the same as those in a conventional data storage device, so the detailed descriptions thereof are omitted here.

Figure 4:
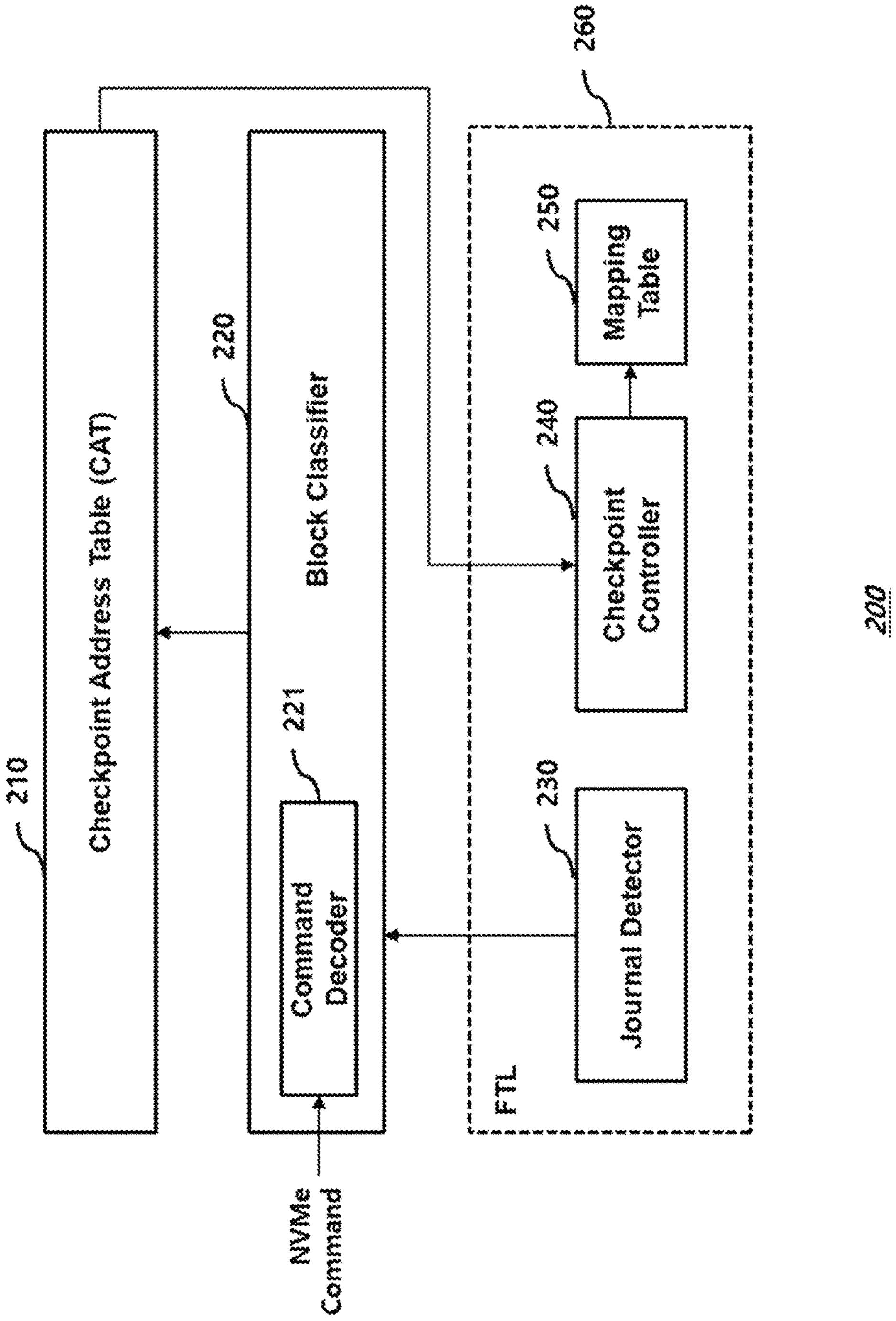
FIG. 4 illustrates a control circuit according to an embodiment of the present disclosure.

FIG. 4 is a block diagram showing a detailed configuration of the control circuit 200.

Referring to FIG. 4, the control circuit 200 includes a checkpoint address table (CAT) 210, a block classifier 220, and a Flash Translation Layer (FTL) 260. The FTL 260 includes a journal detector 230, a checkpoint controller 240, and a mapping table 250.

The checkpoint address table 210 associates and stores a transaction identifier, a journal region logical address, and a data region logical address.

The journal region logical address is a logical address of a journal region where transaction data is stored, and the data region logical address is a logical address of a data region where transaction data will be stored.

The block classifier 220 interprets a transaction command by referring to the journal detector 230, and updates the information of the checkpoint address table 210 if it is a write command for the journal region.

The block classifier 220 may include a command decoder 221 to interpret the transaction command.

For example, if the transaction command is a command according to the NVMe protocol, the command decoder 221 may interpret the transaction command according to the standard.

The journal detector 230 interprets the file system information generated in the data storage device 1000 and stores journal region information accordingly.

The block classifier 220 decodes the transaction command and processes the transaction command by referring to the information in the journal region.

For example, the block classifier 220 checks the journal region logical address where the data is currently stored and the data region logical address where the data will be stored, and associates the two logical addresses with the transaction identifier and stores them in the checkpoint address table 210.

The checkpoint controller 240 updates the mapping table 250 by referring to the checkpoint address table 210 during the checkpointing operation.

The mapping table 250 includes a physical address field and a logical address field as in the conventional case, and may further include a valid field indicating validity of an entry.

Unlike the conventional checkpointing operation, the checkpoint controller 240 in the present embodiment can complete the checkpointing operation through the mapping table 250 update operation without storing data.

The block classifier 220, the journal detector 230, and the checkpoint controller 240 can be implemented as hardware, software, or a combination thereof.

For example, the journal detector 230, the checkpoint controller 240, and the mapping table 250 can be implemented as part of the FTL 260, in which case the FTL 260 can process the operations performed by the conventional FTL together.

As described above, the data storage device 1000 manages transactions on its own, thereby identifying the journal region information of the data storage device 1000 without the intervention of the host, and performs the checkpointing operation on its own by referring to the journal region information.

To this end, the data storage device 1000 performs the journal region detecting operation and the block classifying operation without the intervention of the host, which will be disclosed in detail below.

The journal region detection operation is performed by the journal detector 230.

In the present embodiment, the journal detector 230 detects the journal region using the file system metadata and the super block of the journal region during the initialization process performed during the boot operation.

The structure of the file system and the structure of the journal region are well known from conventional file system technologies, so a repeated description thereof is omitted.

Figure 5:
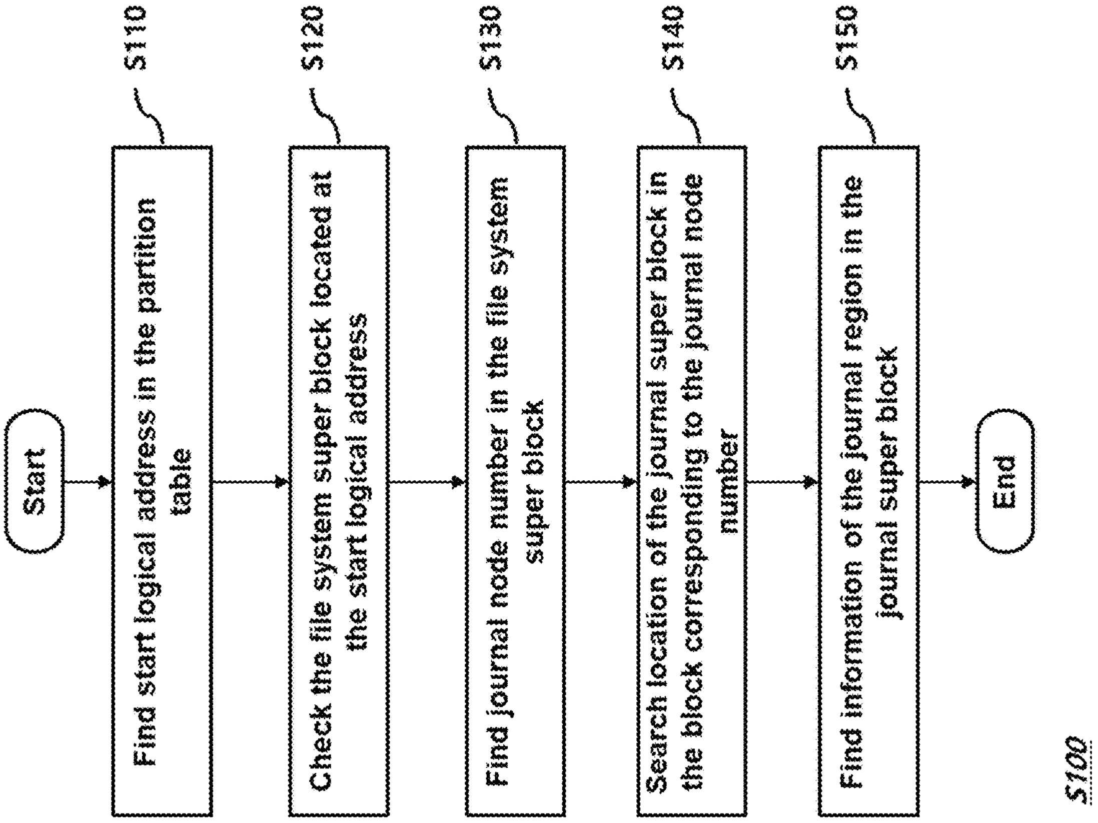
FIG. 5 is a flowchart illustrating an operation detecting a journal region according to an embodiment of the present disclosure.

FIG. 5 is a flowchart showing the journal region detection operation S100.

Referring to FIGS. 4 and 5, the journal detector 230 checks the partition table.

For example, the journal detector 230 checks a GPT signature at the first logical address to check whether the partition type is the master boot record (MBR) type or the GUID partition table (GPT) type.

Since the partition technology of the MBR type or the GPT type itself is a conventional technology, a detailed description thereof is omitted.

The journal detector 230 reads the MBR or GPT to check the partition table and finds the start logical address of the file system in the partition table at S110.

The journal detector 230 searches for a file system super block located at the start logical address of the file system at S120.

The journal detector 230 can check whether the file system has been created and initialized and check the type of the file system by checking metadata such as the magic signature included in the file system super block. In this embodiment the file system is normally initialized.

The journal detector 230 checks the journal node number included in the file system super block at S130.

Thereafter, the journal detector 230 searches for the location of the journal super block in the block located at the journal node number at S140.

Figure 1:
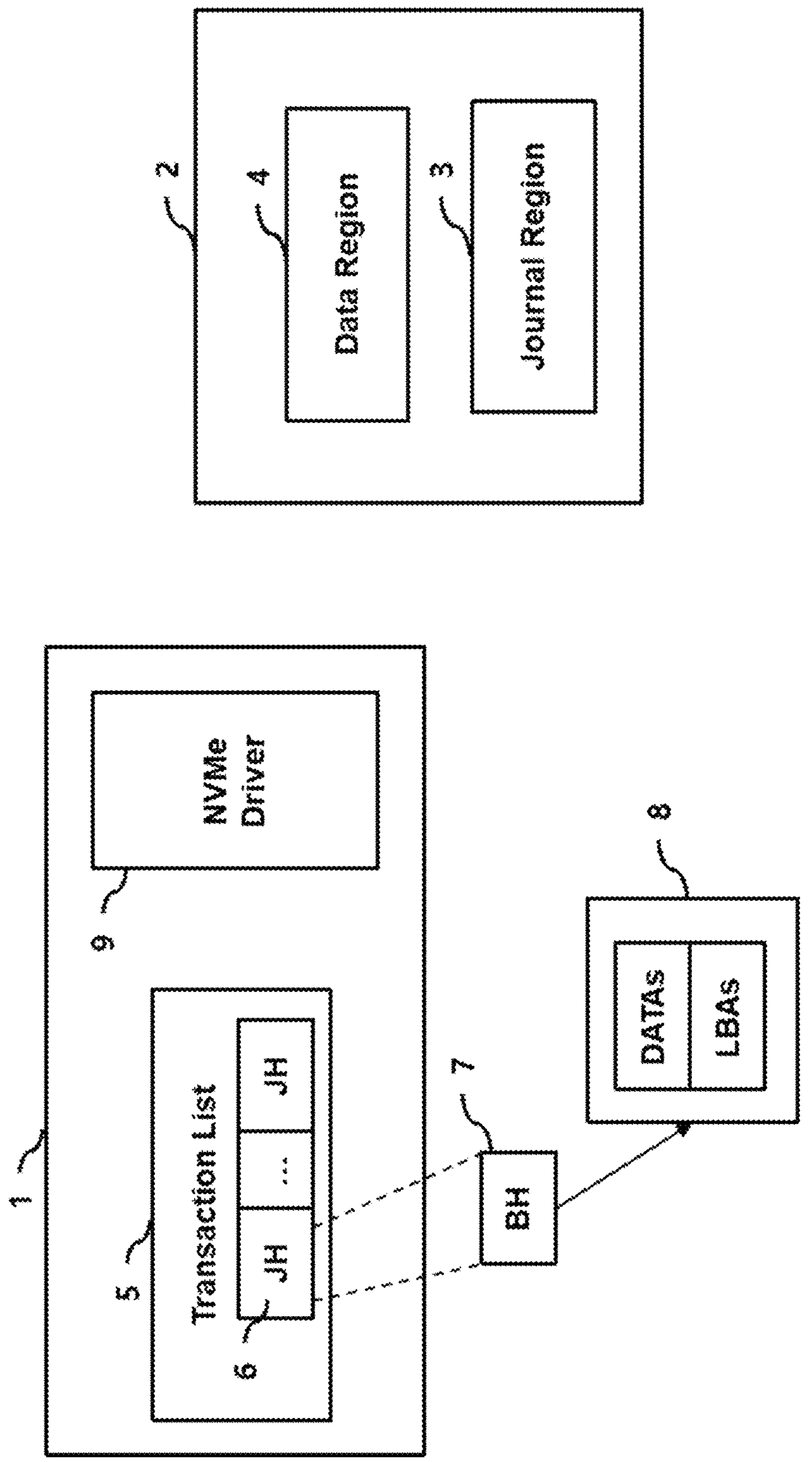
FIG. 1 illustrates a conventional checkpointing operation.
Figure 2:
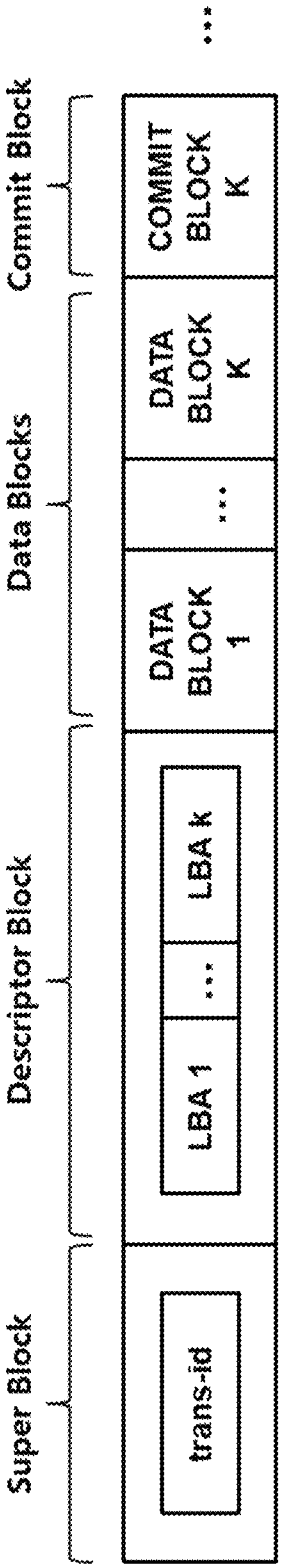
FIG. 2 illustrates a conventional data structure of a journal region.

Thereafter, the journal detector 230 checks the information of the journal region in the journal super block at S150. At this time, the journal super block refers to the super block of FIG. 2.

As aforementioned, the journal super block includes information related to the location of the journal region, such as the start address of the journal region and the length of the journal region, in addition to the transaction identifier.

The journal detector 230 performs the journal region detection operation once during a boot operation and stores information about the location of the journal region, so it does not cause a decrease in performance during the actual input/output (I/O) operation process.

Next, the journaling operation S200 is initiated.

Hereinafter, the operation of storing transaction data in the journal region by a host request is referred to as the journaling operation. At this time, the transaction data refers to data from the descriptor block to the commit block corresponding to one transaction identifier.

The block classifier 220 controls the journaling operation.

The journaling operation of the block classifier 220 is performed during a runtime operation and uses journal region information detected by the journal detector 230 during the initialization process.

Figure 6:
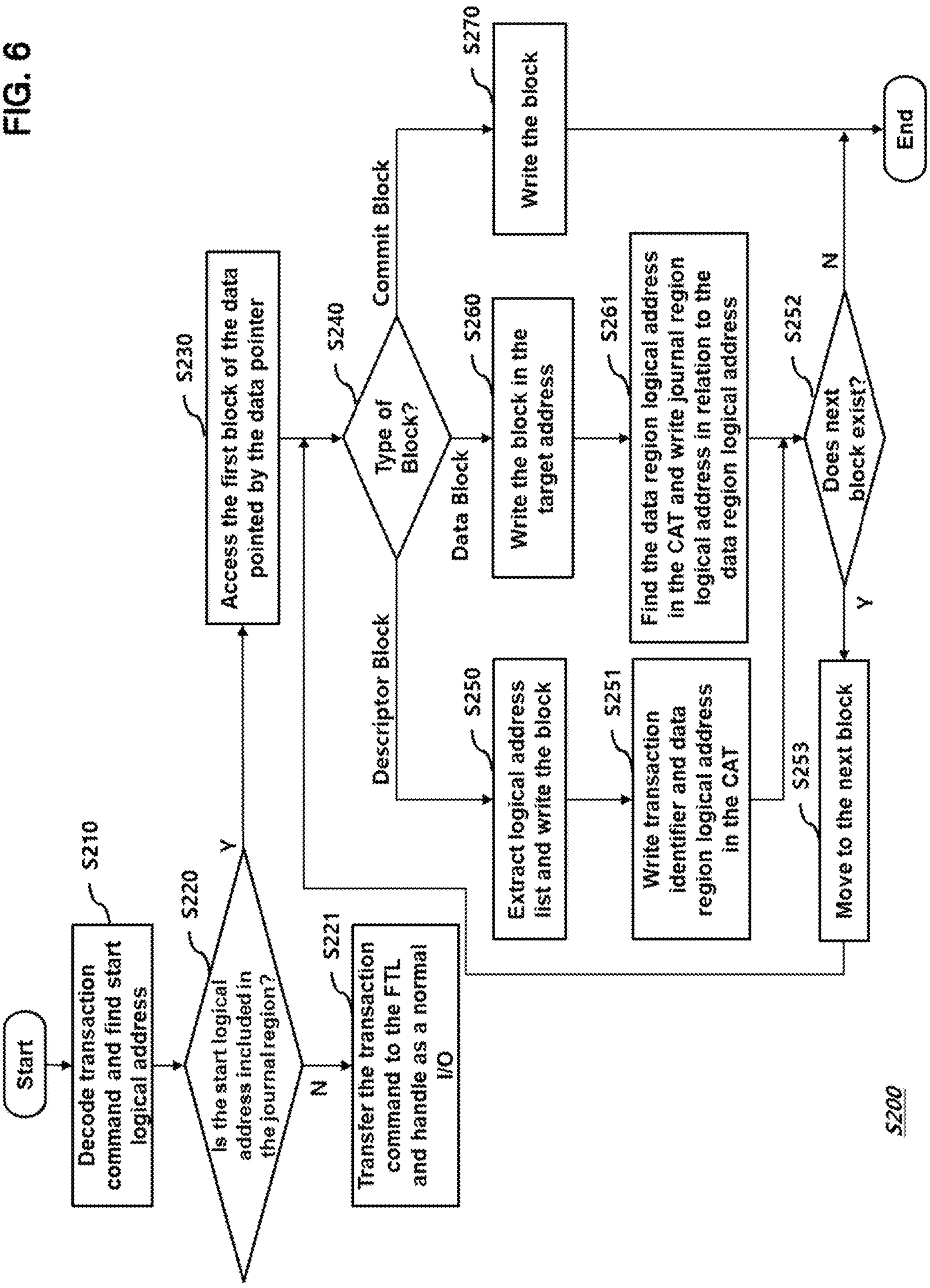
FIG. 6 is a flowchart illustrating a journaling operation according to an embodiment of the present disclosure.

FIG. 6 is a flowchart showing the journaling operation S200 according to an embodiment of the present disclosure.

Referring to FIGS. 4 and 6, one transaction can be performed with one or more transaction commands. Each transaction can be distinguished by a respective transaction identifier.

The transaction command provided from the host is generated according to, for example, the NVMe protocol and is decoded by the command decoder 221.

The transaction command according to the NVMe protocol includes a start logical address, the number of blocks, and a data pointer corresponding to the number of blocks.

Each data pointer indicates an address of the virtual memory where the corresponding block is stored. That is, the data pointer indicates a block stored in the virtual memory managed by the host.

Hereinafter, the start logical address included in the transaction command may be referred to as a target logical address.

Each block includes a block header and block data.

The block header includes metadata indicating a type of the block and a corresponding transaction identifier.

The block data stores corresponding data according to the type of the block.

For example, in the case of a descriptor block, a logical address list corresponds to the block data, and in the case of a data block, the data which is a target of corresponding journaling operation corresponds to the block data.

The block classifier 220 decodes the transaction command to find the start logical address at S210.

The block classifier 220 refers to the detected journal region information to determine whether the start logical address is included in the journal region at S230.

If the start logical address is not included in the journal region, the block classifier 220 transmits the transaction command to the FTL 260 to process the transaction command like the conventional I/O command.

If the start logical address is included in the journal region, the data pointer is checked and the first block of transaction data is accessed by referring to the data pointer at S230.

The block classifier 220 checks the metadata of the block header to determine the type of the block at S240.

If the block type is a descriptor block, the logical address list is extracted and the block is written to the journal region at S250.

When writing the block to the journal region, it is apparent from the conventional technology that a logical address and a corresponding physical address are stored in the mapping table 260, so a detailed description thereof is omitted.

At this time, the logical address list includes a plurality of data region logical addresses to store a plurality of data blocks.

The block classifier 220 stores a plurality of data region logical addresses in association with a transaction identifier in the checkpoint address table 210 at S251.

Thereafter, it is determined whether there is a next block at S252, and if there is a next block, it moves to the next block at S253, and the process goes back to step S240 to repeat the aforementioned operations.

If there is no next block, the operation is terminated.

If the commit block corresponding to the transaction identifier is not stored, the transaction processing is not completed, so in this case, the data storage device 1000 receives the next transaction command and repeats the aforementioned operation.

If the block type is determined as a data block at step S240, the block is written to the journal region at S260.

As described above, when writing a block to the journal region, a logical address and a corresponding physical address are associated and stored in the mapping table 260.

The logical address of the journal region where block data is to be stored corresponds to the start logical address found in S210 and can be referred to as the target address or journal region logical address.

Afterwards, the journal region logical address is recorded in association with the transaction identifier and the data region logical address in the checkpoint address table 210 at S261.

As aforementioned, the transaction identifier can be known by referring to the block header. The data region logical address corresponding to the current data block can be known from the logical address list transmitted through the descriptor block.

For example, when a plurality of data blocks are transmitted in the order stored in the logical address list, the data region logical address corresponding to the current data block can be easily identified by sequentially storing a plurality of data region logical addresses included in the logical address list in the checkpoint address table 210.

Afterwards, the process proceeds to S252 and the operations described above are repeated.

In S240, when the block type is determined as a commit block, the target address is extracted from the block header, the commit block is stored in the journal region at S270, and the operation is terminated.

As aforementioned, when writing a block to the journal region, a logical address and a corresponding physical address are associated and stored in the mapping table 260.

As described above, if the commit block is normally stored, it can be understood that the corresponding transaction is normally recorded in the journal region.

The checkpointing operation is performed on a transaction normally recorded in the journal region.

In this embodiment, the transaction is processed and the checkpointing operation is performed immediately.

The checkpointing operation can be performed in various ways depending on the embodiment.

For example, the checkpointing operation can be performed after a predetermined number of transactions are recorded in the journal region.

In this embodiment, since the operation of rewriting data is not performed during the checkpointing operation, even if the checkpointing operation is performed immediately after the transaction is processed, the overhead increase is minimal.

The checkpointing operation is performed by the checkpoint controller 240.

Figure 7:
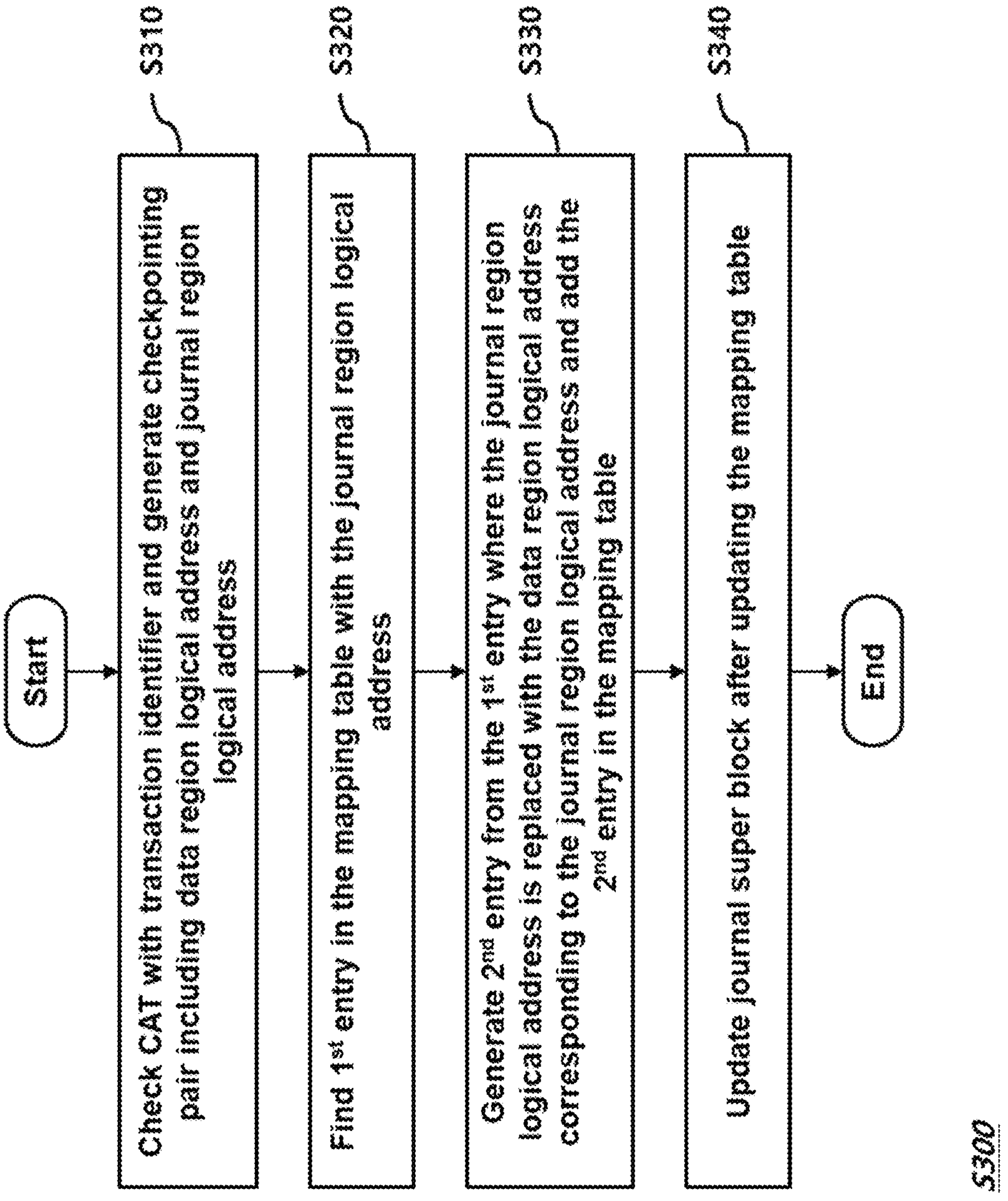
FIG. 7 is a flowchart illustrating a checkpointing operation according to an embodiment of the present disclosure.

FIG. 7 is a flowchart showing a checkpointing operation S300 according to an embodiment of the present disclosure.

Referring to FIGS. 4 and 7, first, a checkpointing address table 210 is searched using a transaction identifier that requires a checkpointing operation, and a checkpointing pair including a data region logical address and a journal region logical address is generated.

In this embodiment, a checkpointing operation is performed immediately after processing a transaction is completed, so the checkpoint controller 240 can receive a transaction identifier of a transaction whose processing is completed from the block classifier 220.

In another embodiment, a transaction identifier located in the super block of the journal region is checked, and transaction identifiers larger than the transaction identifier are sequentially selected to find a transaction identifier for which a checkpointing operation is to be performed.

Next, a first entry is searched in the mapping table 250 using a journal region logical address at S320.

Next, a second entry is generated from the first entry wherein a journal region logical address is replaced with a data region logical address corresponding to the journal region logical address, and the second entry is added to the mapping table at S330. If the second entry is written normally, the first entry is invalidated.

There may be multiple checkpointing pairs, and in this case, the above-described operation is repeated for each.

Accordingly, when the update to the mapping table 250 is completed, the checkpointing operation is completed, so the transaction identifier is updated in the super block of the journal area at S340.

In this way, the present invention omits the operation of rewriting data to the data region during the checkpointing operation by only updating the mapping relationship in the mapping table 250 by referring to the checkpoint address table 210.

If necessary, the checkpoint controller 240 can perform a management operation on the mapping table 250 by notifying the FTL 260 that the checkpointing operation is completed.

For example, the FTL 260 can perform an operation of removing an invalidated entry from the mapping table 250 to secure a storage space so that a new entry can be added thereto.

Although various embodiments have been illustrated and described, various changes and modifications may be made to the described embodiments without departing from the spirit and scope of the present disclosure as defined by the following claims. Furthermore, the embodiments may be combined to form additional embodiments.

What is claimed is:

1. A data storage device comprising:
- a memory array including a data region and a journal region; and
- a control circuit configured to
- generate journal region information including an address of the journal region,
- process a transaction command corresponding to a transaction based on the journal region information, and
- perform a checkpointing operation on a selected transaction among a predetermined number of transactions,
- wherein the control circuit includes:
- a checkpoint address table configured to store an entry including a transaction identifier, a data region logical address, and a journal region logical address;
- a mapping table configured to store a mapping relationship between a logical address and a physical address; and
- a checkpoint controller configured to update the mapping relationship of the mapping table based on the checkpoint address table during the checkpointing operation, and
- wherein the checkpoint controller is configured to:
- control a checkpointing operation for the selected transaction;
- check the checkpoint address table based on a transaction identifier corresponding to the selected transaction to generate a checkpointing pair including a data region logical address and a journal region logical address; and
- search a first entry in the mapping table based on the journal region logical address included in the checkpointing pair, and add, in the mapping table, a second entry where a journal region logical address of the first entry is replaced with a data region logical address.

2. The data storage device of claim 1, wherein the control circuit further includes:
- a journal detector configured to generate the journal region information during an initialization operation; and
- a block classifier configured to determine whether the transaction command corresponds to the journal region, and add an entry corresponding to the transaction command in the checkpoint address table.

3. The data storage device of claim 2, wherein, during the initialization operation, the journal detector is configured to:

search a partition table formed by a file system in the memory array;

search a file system super block using information of the partition table;

search a journal super block using information of the file system super block; and search the journal region information using information of the journal super block.

4. The data storage device of claim 2, wherein the block classifier is configured to search a start logical address by decoding the transaction command, and store a block in the journal region based on a data pointer included in the transaction command when the start logical address is included in the journal region.

5. The data storage device of claim 4, wherein the block classifier is configured to store the block in the journal region, and store an entry in the mapping table, the entry including a physical address and a logical address corresponding to the block.

6. The data storage device of claim 5, wherein, when a type of the block is a descriptor block, the block classifier is configured to store a plurality of data region logical addresses included in a logical address list in the checkpoint address table relating to a transaction identifier.

7. The data storage device of claim 5, wherein, when a type of the block is a data block, the block classifier is configured to store a journal region logical address corresponding to the start logical address in the checkpoint address table relating to a data region logical address corresponding to the journal region logical address.

8. The data storage device of claim 5, wherein, when a type of the block is a commit block, the block classifier is configured to store the block in the journal region.

9. The data storage device of claim 7, wherein, after the predetermined number of transactions are processed, the checkpoint controller is configured to perform the checkpointing operation for the selected transaction.

10. The data storage device of claim 1, further comprising:

an interface circuit configured to communicate with a host;

a dynamic random access memory (DRAM) configured to store data temporarily;

a memory controller configured to control the DRAM; and an interconnect circuit configured to connect the control circuit, the interface circuit, the DRAM, and the memory controller.

11. A method of operating a data storage device, the method comprising:

assigning a data region and a journal region in a memory array;

generating journal region information including an address of the journal region;

processing a transaction command corresponding to a transaction based on the journal region information;

determining whether the transaction command corresponds to the journal region, and adding an entry corresponding to the transaction command in a checkpoint address table, the checkpoint address table storing an entry including a transaction identifier, a data region logical address, and a journal region logical address; and performing a checkpointing operation on a selected transaction among a predetermined number of transactions by updating a mapping relationship between a logical address and a physical address stored in a mapping table based on the checkpoint address table during the checkpointing operation.

12. The method of claim 11, further comprising:

generating the journal region information during an initialization operation.

13. The method of claim 12, further comprising, during the initialization operation:

searching a partition table formed by a file system in the memory array;

searching a file system super block from information of the partition table;

searching a journal super block from information of the file system super block; and searching the journal region information from information of the journal super block.

* * * * *